United States Patent [19]

Sikorski

[11] Patent Number: 4,840,536

[45] Date of Patent: Jun. 20, 1989

[54] AXIAL GUIDE BLADE ASSEMBLY FOR A COMPRESSOR STATOR

[75] Inventor: Siegfried Sikorski, Munich, Fed. Rep. of Germany

[73] Assignee: MTU Motoren-und Turbinen-Union Muenchen GmbH, Munich, Fed. Rep. of Germany

[21] Appl. No.: 173,233

[22] Filed: Mar. 24, 1988

[30] Foreign Application Priority Data

Apr. 7, 1987 [DE] Fed. Rep. of Germany ....... 3711764

[51] Int. Cl.$^4$ ............................................. F01D 9/04
[52] U.S. Cl. ................................. 415/190; 415/200; 416/218
[58] Field of Search ............... 416/241 A, 218, 229 A, 416/230 R; 415/214, 189, 190

[56] References Cited

U.S. PATENT DOCUMENTS

| | | | |
|---|---|---|---|
| 1,544,318 | 6/1925 | Hodgkinson | 416/218 |
| 2,637,488 | 5/1953 | Krouse et al. | 415/190 |
| 2,868,439 | 1/1959 | Hampshire et al. | 415/214 X |
| 3,393,436 | 7/1968 | Blackhurst et al. | 29/156.8 |
| 3,442,442 | 5/1969 | Seiwert | 415/189 |
| 3,515,501 | 6/1970 | Palfreyman et al. | 416/230 X |
| 3,675,294 | 7/1972 | Palfreyman et al. | 416/230 R X |
| 3,801,221 | 4/1974 | Zlotek | 416/214 |
| 3,904,316 | 9/1975 | Clingman et al. | 416/218 |
| 4,191,510 | 3/1980 | Teysseyre et al. | 416/241 A X |
| 4,339,229 | 7/1982 | Rossman | 416/218 |
| 4,397,609 | 8/1983 | Kochendorfer | 416/218 X |

FOREIGN PATENT DOCUMENTS

| | | | |
|---|---|---|---|
| 614766 | 2/1961 | Canada | 415/214 |
| 627676 | 9/1961 | Canada | 415/214 |
| 17327 | 5/1971 | Japan | 415/190 |
| 496377 | 3/1976 | U.S.S.R. | 415/190 |
| 660383 | 11/1951 | United Kingdom | 415/190 |
| 1287223 | 8/1972 | United Kingdom | 416/218 |

Primary Examiner—Everette A. Powell, Jr.
Attorney, Agent, or Firm—W. G. Fasse; D. H. Kane, Jr.

[57] ABSTRACT

In an axial guide blade assembly for a compressor stator, the root end of each guide blade is attached in a ring gap of a preferably axially split, i.e. split along a normal plane, compressor housing made of a fiber reinforced synthetic material. The root of each blade is received in the ring gap or circumferential groove formed between two adjacent housing sections joined together along the axial separating plane. The guide blades hang on fiber rings with which the blade roots are clamped into the circumferential groove.

11 Claims, 2 Drawing Sheets

AXIAL GUIDE BLADE ASSEMBLY FOR A COMPRESSOR STATOR

FIELD OF THE INVENTION

The invention relates to an axial guide blade assembly for a compressor stator having guide blades or stator blades or baffles held in a preferably axially divided compressor housing. The root ends of the blades have grooves for receiving a fiber ring.

DESCRIPTION OF THE PRIOR ART

It has already been suggested to use metal compressor housings for gas turbine engines. These housings are split along axial or radial planes into separate rings or ring elements. Thus, the housing is assembled of these separate housing rings or ring elements. Such housings are typically used for turbine machines, especially gas turbine engines. The split ring structure is intended to facilitate the maintenance, assembly, installation, and dismantling of the turbine machine, and to improve the desired dimensional stability of the housing during operation. In such sectional or split compressor housings, as well as in one-piece compressor housings, the guide blades or stator blades, for example have dove-tail shaped or hammerhead shaped blade roots which are set into correspondingly shaped circumferential grooves of the housing.

However, the above described concepts entail disadvantages, among others, in terms of a relatively high weight and a comparatively complicated structure. Furthermore, according to these concepts, it is difficult to construct and arrange the guide apparatus or the axial guide stator blade assembly so as to achieve a uniform thermal expansion compensation without compromising the required profile geometry and tip-gap geometry, that is, the geometry of the gap between the stator blade tip and the rotor.

Furthermore, the above described concepts do not appear to provide any precautionary measures for compensating extraordinary force loads on the blade which can occur, for example, through bird impact during flight. Such force compensation is necessary so that the compressor housing and the blade attachment structure, as well as the other engine components, are protected as much as possible and thus damaged as little as possible.

In order to reduce the weight of the compressor and thus the weight of the entire engine, it has also been suggested heretofore to make the compressor housing structure of fiber reinforced synthetic materials, whereby the respective fiber composite materials could be specifically adapted to the locally desired thermal and mechanical strength requirements. In contrast to the above described concepts utilizing metal compressor housings, in the further known solutions using fiber reinforced synthetic material housings, it is practically impossible to mechanically machine, for example to mill, appropriate circumferential grooves into the fiber composite housing material for receiving the guide blade roots. The characteristics of the fiber composite structure do not allow such a production machining process. Such a machining operation would lead to local breaking and fraying of the fiber composite structure, as well as to a considerable weakening of the total structural rigidity and strength due to local cracks in the fiber bands. The thermal expansion characteristics would also be impaired by such machining operations.

The above described use of fiber composite materials in the compressor housing does not disclose any method for securing the guide blades to the housing which would be especially suitable for compensating relatively high impact loading of the blades, for example due to bird impact. Such loads must be transmitted or dissipated or compensated with as little danger as possible. Furthermore, with regard to intermittent non-static load conditions, no method is suggested by the prior art for assuring a circumferentially uniform thermal expansion of the guide blade or stator assembly in order to achieve low gap losses.

A known method for securing guide blades or stator blades in a compressor housing is disclosed in U.S. Pat. No. 3,393,436. In that prior method, openings are first machined in the respective housing segment. Then, corresponding locally thickened root sections of the guide blades are inserted into the openings. The blades are then bonded in the openings, for example by using a synthetic resin. The thickened root sections are to protrude beyond the inner or outer surfaces of the housing segment. Grooves machined in a circumferential direction into the middle of each blade root section outside of the housing, receive a fiber bandage or wrapping comprising several single wrapping layers which are bonded both to the housing segment, as well as to the blade root section. With the described blade arrangement as well as the arrangement of the outer fiber bandage in such known method, it would not be possible to realize a uniform thermal compensation which is as independent as possible from the housing, that is, a uniform expansion of the stator blade assembly into the housing.

Furthermore, in the above U. S. Patent, extreme forces applied to the stator assembly, for example in the case of a bird impact, could practically not be controlled in the sense of a homogeneous and uniform force dissipation through the fiber bandage employed therein. The fiber bandage is primarily only an outer radial securing means for the guide blades which are otherwise locally mechanically secured or specially bonded to the housing. In extreme cases of bird impact forces, damage to the housing could not be prevented in the known arrangement, especially considering the use of a compressor housing made of a synthetic material.

A further disadvantage of the known arrangement which cannot be ignored, is a weakening of the strength and stiffness of the housing structure which could be expected to be caused by the number of holes in the housing corresponding to the number of blades.

OBJECTS OF THE INVENTION

In view of the foregoing it is the aim of the invention to achieve the following objects singly or in combination:

to provide an axial stator guide blade assembly and a manner of attaching it to a compressor housing which achieves the low weight and high strength associated with a housing made of fiber composite materials, but does not have the disadvantages of the prior art;

to provide such a stator blade assembly with a simple and inexpensive construction which may be easily attached or anchored to a compressor housing in a form and force-locking manner;

to achieve low gap losses in a compressor using such a stator blade assembly by achieving uniform thermal expansion and compensation;

to achieve and maintain an optimum blade profile and gap geometry in such a stator blade assembly; and to attach the individual blades in a secure and force transmitting manner to the stator assembly, to make sure that even under extreme stator loading, for example, in the case of a bird impact in a turbine engine, the damages are minimized.

SUMMARY OF THE INVENTION

The above objects have been achieved in an axial guide blade assembly for a compressor stator according to the invention, in which the blade roots are received in a circumferential groove of the stator housing. This groove is formed in two adjacent housing sections which are joined together along a radial separation plane. The guide blade roots are held in place in the groove by fiber rings and are clamped with the fiber rings in the circumferential grooves.

Through the use of a e.g. axially split or divided housing structure, the guide blades, which are held at an appropriate circumferential spacing from one another by means of the fiber ring, can uniformly expand into the housing or rather into the associated circumferential groove of the compressor housing. Since the fiber rings have a larger radially directed thermal expansion coefficient in operation than the thermal expansion coefficient of the housing, the roots of the guide blades are clamped against the housing, or rather, in the circumferential grooves, and thereby are secured against rotational movement. An extreme force loading of the blades, for example in the case of a bird impact, shall be transmitted and dissipated through the fiber ring as homogeneously as possible. Advantageously, the stator blade assembly shall remain in position even if one or both fiber rings should break which might occur in spite of a careful selection of the fiber composite material. Furthermore, the danger of damaging the compressor housing in the case of an extreme force loading of the blade, for example due to a bird impact, is largely eliminated by the described guide blade attachment and arrangement according to the invention. Thus, it becomes possible to use even relatively brittle, high temperature resistant synthetic material for the compressor housing.

According to further features of the invention the blade root of each guide blade has recesses for receiving the fiber rings at a respective leading edge and trailing edge area of the blade root. Each fiber ring has circumferentially spaced locating gaps for receiving the roots of the blades, whereby the locating gaps may be in the form of axially directed grooves or notches in the fiber rings. At least one fiber ring is rotationally securely attached to a housing segment. Specifically, the fiber rings are made of carbon or glass fibers or a combination thereof embedded in a synthetic resin matrix such as, for example, especially a temperature resistant polyimide or thermoplastic matrix. The compressor housing itself may also be made of a carbon fiber reinforced synthetic material such as a carbon fiber composite material with a matrix of epoxide or polyimide resin. The stator blade assembly may be used for compressors or blowers of gas turbine engines, especially jet engines.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
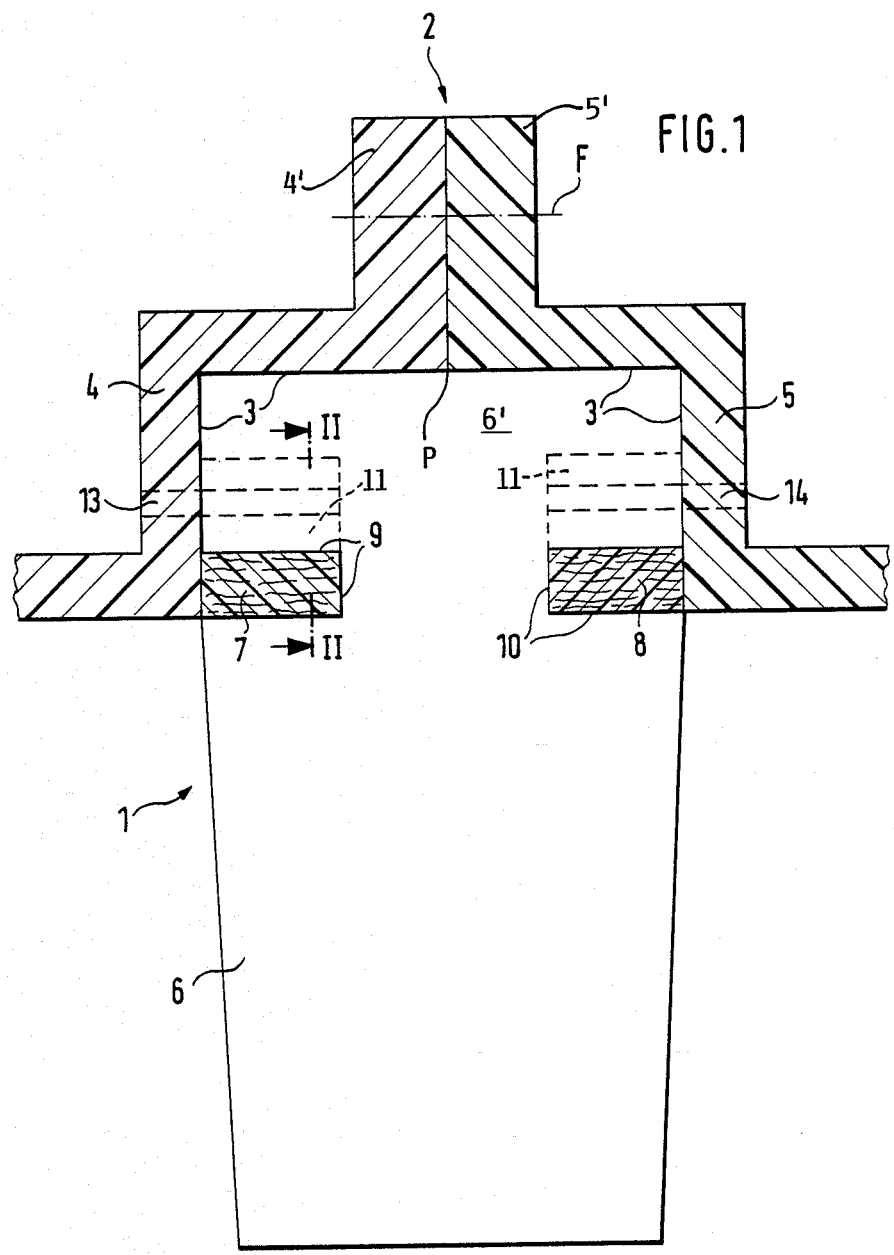
FIG. 1 is a partial lengthwise or axial section through an axially split compressor housing, with a stator assembly showing the attachment of a stator guide blade to the housing by means of fiber rings.

As shown in FIG. 1, an axial guide blade assembly 1 for a compressor has guide blades 6 attached at a root end 6 to a radially divided compressor housing 2 which is made of a fiber reinforced composite synthetic material. The compressor housing 2 has a longitudinal housing axis coinciding with the rotational axis of the compressor rotor not shown. With respect to the longitudinal housing axis the housing is radially divided. However, with respect to the axes of the guide blades 6 the housing is divided axially. The blade axes extend substantially radially relative to said housing axis. The divided housing 2 includes neighboring housing sections 4 and 5 which are attached to each other, for example screwed together, along flanges 4' and 5', whereby the screws extend along the line F perpendicularly to the separating plane P. An inner circumferential groove 3 is formed between the two adjacent housing sections 4 and 5 and receives the root end 6' of the blades 6. The guide blades 6 hang on two fiber rings 7 and 8 and together with these rings are clamped into the circumferential groove 3 due to the effect of thermal expansion at the high temperatures arising during operation. In order to hang the guide blades 6 onto the two fiber rings 7 and 8, open recesses 9 and 10 extend from the front or leading edge and from the rear or trailing edge of the guide blades axially inwardly into the root end of each guide blade 6.

Figure 2:
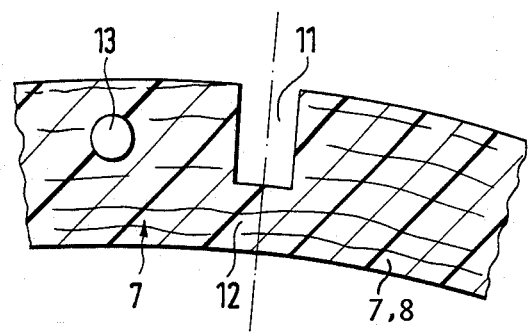
FIG. 2 is a section along the section line II—II of FIG. 1, through a fiber ring.
Figure 3:
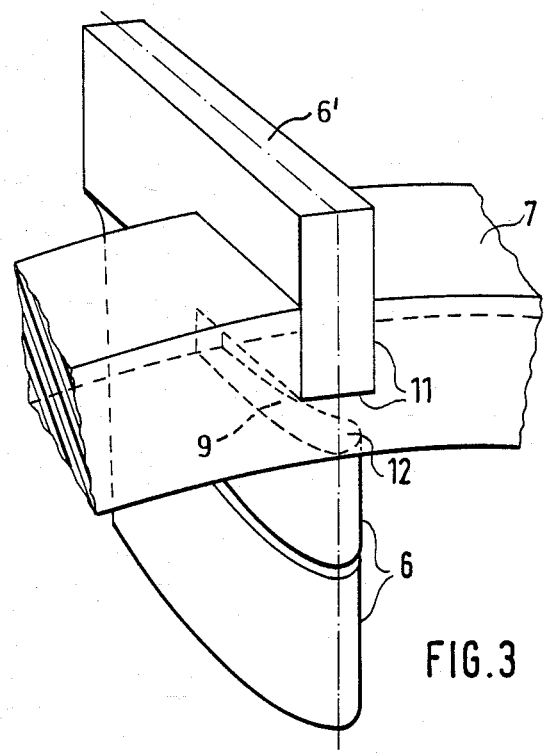
FIG. 3 is a perspective view of a stator guide blade hanging on a fiber ring.

As shown in FIGS. 2 and 3, in order to position the guide blades 6 at the appropriate circumferential spacing with respect to one another in the resting position, the fiber rings, for example the fiber ring 7 shown, are provided with guide or locating gaps 11 for receiving the guide blade 6. The locating gaps 11 may be embodied as axial grooves uniformly distributed around the circumference of the fiber ring 7 at equal circumferential spacings. The fiber ring sections 12 forming the base of each locating gap 11 are thereby received in or surrounded in a hook-like manner by the blade grooves such as blade groove 9 shown in FIG. 1.

As shown in FIGS. 1 and 2, both fiber rings 7 and 8 are attached to the housing sections 4 and 5 in an axial direction, for example, here by means of metal pins 13 and 14 respectively, arranged at several locations distributed uniformly around the circumference of the fiber rings 7 and 8 in order to provide an additional securing against circumferential rotation in the example embodiment at hand.

As shown in the perspective view of FIG. 3, the root end of the guide blade 6 may essentially have a box-shape or, in other words have a shape profile defined by straight lines and planar walls. The guide blade 6 has the required airfoil shape below or radially inwardly from the associated fiber ring 7.

In order to achieve the clamping effect desired during operation, the fiber rings 7 and 8 shall have a larger thermal expansion coefficient in the radial direction than the corresponding thermal expansion coefficient of the compressor housing 2. In other words, the compressor housing 2 can be constructed of materials having a lower thermal expansion coefficient in the radial direction than the thermal expansion coefficient of the fiber rings 7 and 8.

The fiber rings 7 and 8 may essentially be made of carbon fibers or glass fibers or a combination of such fibers, whereby the fibers are embedded in a matrix of a synthetic resin, especially a high temperature resistant polyimide or thermoplastic matrix. Various different types of fibers may be combined in a single ring in order to selectively adjust the thermal expansion coefficient of the fiber ring. The fiber rings 7 and 8 can be built up by wrapping separate threads or woven bands. The thermal expansion coefficient may be adjusted or selected in an order of magnitude from approximately 1 to $4 \times 10^{-6} \, °C.^{-1}$.

The compressor housing 2 is preferably made of a carbon fiber reinforced synthetic material, whereby the thermal expansion of the housing is selected or adjusted to be relatively small so that a reduction of gap losses may be achieved. In other words, the clearance gap between the stator blade tips and the rotor may be smaller.

In a preferred embodiment, the compressor housing is made of a fiber composite material based on carbon fibers embedded in an epoxide or polyimide resin matrix.

The preferred use of the guide blade stator assembly according to the invention is for compressors or blowers of gas turbine engines, especially jet engines.

Although the invention has been described with reference to specific example embodiments, it will be appreciated, that it is intended to cover all modifications and equivalents within the scope of the appended claims.

Further the invention is suitable for compressor or blower guide baffle assemblies incorporating axially and/or radially divided compressor housing structures.

What I claim is:

1. An axial guide blade assembly, especially for a compressor stator, comprising compressor housing means having a longitudinal housing axis, said housing means including housing sections divided in a plane (P) extending perpendicularly to said longitudinal housing axis, said housing sections forming an inner circumferential groove in said housing means, a plurality of guide blades each having a longitudinal blade axis extending substantially radially to said longitudinal housing axis, each of said guide blades having a root an a guide section, two fiber rings for mounting said guide blades in said inner circumferential groove, each guide blade having two recesses in and near its root, one of said recesses being arranged at a front edge of said guide blade near said root and the other of said recesses being arranged at a rear edge of each guide blade near said root, thereby forming a front edge group of recesses and a rear edge group of recesses, each group of recesses receiving one of said fiber rings, each of said fiber rings (7, 8) having a plurality of locating gaps (11), one guide blade being received in each locating gap, so that each of said guide blades is suspended by said rings in said recesses, wherein said fiber rings having a radially directed thermal expansion coefficient, relative to said longitudinal housing axis, which expansion coefficient is greater than a corresponding thermal expansion coefficient of said compressor housing means, whereby said guide blades and said fiber rings are clamped together in said inner circumferential groove of said housing means due to said different thermal expansion coefficients.

2. The stator blade assembly of claim 1, wherein said locating gaps (11) comprise axial grooves in said fiber rings uniformly circumferentially spaced around said fiber rings, whereby said blade recesses receive in a hooking manner a continuous fiber ring segment which forms the base of said axial grooves in said fiber rings.

3. The stator blade assembly of claim 1, wherein said locating gaps are provided on a radially outer surface of said fiber rings.

4. The stator blade assembly of claim 1, wherein said locating gaps are provided on a radially inner surface of said fiber rings.

5. The stator blade assembly of claim 1, further comprising attachment means for attaching at least one of said fiber rings to at least one of said housing sections so as to secure said fiber rings against rotation.

6. The stator blade assembly of claim 5, wherein said attachment means comprise a plurality of axially extending attachment pins spaced uniformly around the circumference of said fiber rings.

7. The stator blade assembly of claim 1, wherein said fiber rings are made essentially of fiber material selected from a group including carbon fibers and glass fibers.

8. The stator blade assembly of claim 7, wherein said fiber material comprises a combination of different fiber types selected from a group including carbon fibers and glass fibers.

9. The stator blade assembly of claim 7, further comprising a synthetic resin matrix material selected from the group including temperature resistant polyimides, thermoplastics, or carbon matrix materials, whereby said fiber material is embedded in said matrix material to form said fiber rings.

10. The stator blade assembly of claim 1, wherein said compressor housing is made of a carbon fiber reinforced synthetic material.

11. The stator blade assembly of claim 10, wherein said fiber reinforced synthetic material is a fiber composite material comprising carbon fibers in a matrix material selected from a group including epoxide resins and polyimide resins.

* * * * *

UNITED STATES PATENT AND TRADEMARK OFFICE
CERTIFICATE OF CORRECTION

PATENT NO. : 4,840,536

DATED : June 20, 1989

INVENTOR(S) : Siegfried Sikorski

It is certified that error appears in the above-identified patent and that said Letters Patent is hereby corrected as shown below:

In Claim 1, Column 5, line 51, replace "an" by --and--;

In Claim 1, Column 5, line 55, replace "said" by --each--.

Signed and Sealed this

Twentieth Day of February, 1990

Attest:

JEFFREY M. SAMUELS

*Attesting Officer*    *Acting Commissioner of Patents and Trademarks*